United States Patent

Suzuki

[11] Patent Number: 5,193,856
[45] Date of Patent: Mar. 16, 1993

[54] PIPE CONNECTOR

[76] Inventor: Shigeru Suzuki, 745-3, Matsunaga, Numazu-ken, Shizuoka-ken 410, Japan

[21] Appl. No.: 704,417

[22] Filed: May 22, 1991

[30] Foreign Application Priority Data

May 24, 1990 [JP] Japan .............................. 2-54261[U]
Sep. 6, 1990 [JP] Japan .................................. 2-93742

[51] Int. Cl.⁵ .............................................. F16L 37/00
[52] U.S. Cl. ...................................... 285/308; 285/315
[58] Field of Search ........................ 285/308, 315, 340

[56] References Cited

U.S. PATENT DOCUMENTS

| | | | |
|---|---|---|---|
| 4,123,090 | 10/1978 | Kotsakis et al. | 285/340 X |
| 4,288,113 | 9/1981 | Saulnier | 285/308 X |
| 4,630,848 | 12/1986 | Twist et al. | 285/308 |
| 4,676,530 | 6/1987 | Nordgren et al. | 285/340 X |
| 4,747,626 | 5/1988 | Hama et al. | 285/308 |
| 4,804,213 | 2/1989 | Guest | 285/308 |
| 4,895,395 | 1/1990 | Ceriani | 285/340 X |
| 4,919,457 | 4/1990 | Moretti | 285/308 X |

Primary Examiner—Michael F. Trettel
Attorney, Agent, or Firm—Darby & Darby

[57] ABSTRACT

A pipe connector comprises a pipe connector body, said pipe connector body including: a first portion of a diametrically larger inner cross section adjacent a mouth of said connector and a second portion of a diametrically smaller inner cross section extending inwardly from said first portion; an O-ring inserted in said second portion for establishing airtight seal between said second portion and the leading end of an inserted pipe; a spring receiver and a stop ring secured in said first portion; a circular groove formed between said spring receiver and a stop ring in said first portion; an annular plate spring having a plurality of inwardly extending resilient pawls that may engage with the groove formed on the outer surface of the pipe inserted, for preventing the inserted pipe from slipping off the connector; and a push member slidably inserted in said stop ring, said push member having a rear end extending from the mouth of the pipe connector body, and a leading end which, when pushed in for disconnection of the pipe, may bend and spread said resilient pawls.

4 Claims, 5 Drawing Sheets

PIPE CONNECTOR

FIELD OF THE INVENTION

The invention pertains to a pipe connector suitable for connecting pipes for use with, e.g. air conditioning systems.

BACKGROUND OF THE INVENTION

There have been used various kinds of pipe connectors. They vary widely in structure. A typical pipe connector is shown in FIG. 1, which includes a union 17 joined to a pipe 16B by welding or soldering. A mating pipe 18A is provided with a protrusion or flange 19 formed on its leading end after a nut 18 is mounted thereon. The pipes 18A and 18B are connected by tightening the nut 18, with an O-ring inserted between union 17 and the flange 19.

However, since such conventional connector as mentioned above requires many connecting steps and one or more tools such as spanners for tightening the nut on the union, pipe connection efficiency is very low. Furthermore, since it requires a certain work space for handling the parts and the tools, it is difficult to apply the connector to the pipes to be installed in a narrow space.

BRIEF SUMMARY OF THE INVENTION

The invention is directed to overcome those problems encountered in conventional pipe connectors as mentioned above. A primary object of the invention is therefore to provide a pipe connector for detachably connecting two pipes in airtight conditon by inserting a pipe into said pipe connector. The pipe may be disconnected from the connector, if desired. The pipe connector of this invention comprises a pipe connector body which includes: a first portion of a diametrically larger inner cross section adjacent a mouth of said connector and a second portion of a diametrically smaller inner cross section extending inwardly from said first portion; an O-ring inserted in said second portion for establishing an airtight seal between said second portion and the leading end of an inserted pipe; a spring receiver and a stop ring secured in said first portion; a circular groove formed, between said spring receiver and a stop ring, on the inside of said diametrically larger section; an annular plate spring having a plurality of inwardly extending resilient pawls that may engage with the groove formed on the outer surface of the pipe inserted, for preventing the inserted pipe from slipping off the connector; and a push member slidably inserted in said stop ring, said push member having a rear end extending from the pipe receiving mouth of the pipe connector body, and a leading end which, when pushed in for disconnection of the pipe, may bend and spread said resilient pawls.

With this pipe connector, it is possible to connect and disconnect pipes without using any piping tools by simply applying a force on one of the pipes in one direction. The pipes will not come off the connector by themselves even under increased inner fluid pressure.

During connecting and disconnecting the pipes, resilient pawls of the annular plate spring may freely deviate within the circular groove formed between the spring receiver and the stop ring. Each pawl is supported by the spring receiver and the stop ring. The annular plate spring is acted on a uniform force on the entire spring and thus may bend evenly in its axial direction, so that the spring is not subjected to a sharp strain which causes cracks or breaks, and has a long life.

When a fluid force or inner pressure acts on the pipe inserted in the connector, the pipe may be displaced with the O-ring thereon, which O-ring always serves to maintain airtight seal between the pipe and the connector, so that the leakage of the fluid through the pipe will not occur.

The pipe connector may be used in a narrow space, for example in an engine room of a car, for very easy and very efficient connection and disconnection of pipes.

BRIEF DESCRIPTION OF THE DRAWINGS

FIG. 7 is a partial cross section of the annular plate spring during the insertion of a pipe; FIG. 8 is a partial cross section of the spring after the insertion of the pipe; FIG. 9 is a cross section of the spring during removed of the pipe; and FIG. 10 is the partial cross section of the pipe connector and the pipe under increased fluid pressure.

DETAILED DESCRIPRION OF THE PREFERRED EMBODIMENT

Figure 1:
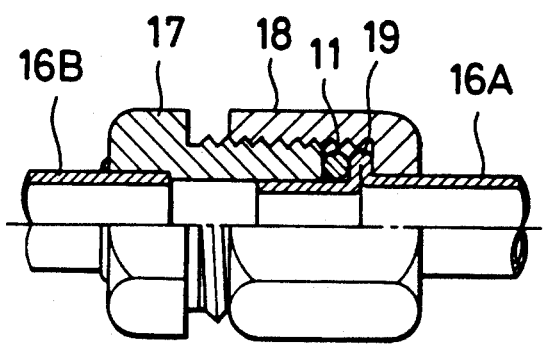
FIG. 1 is a front view of a conventional pipe connector, with a portion cut away for illustration.
Figure 2:
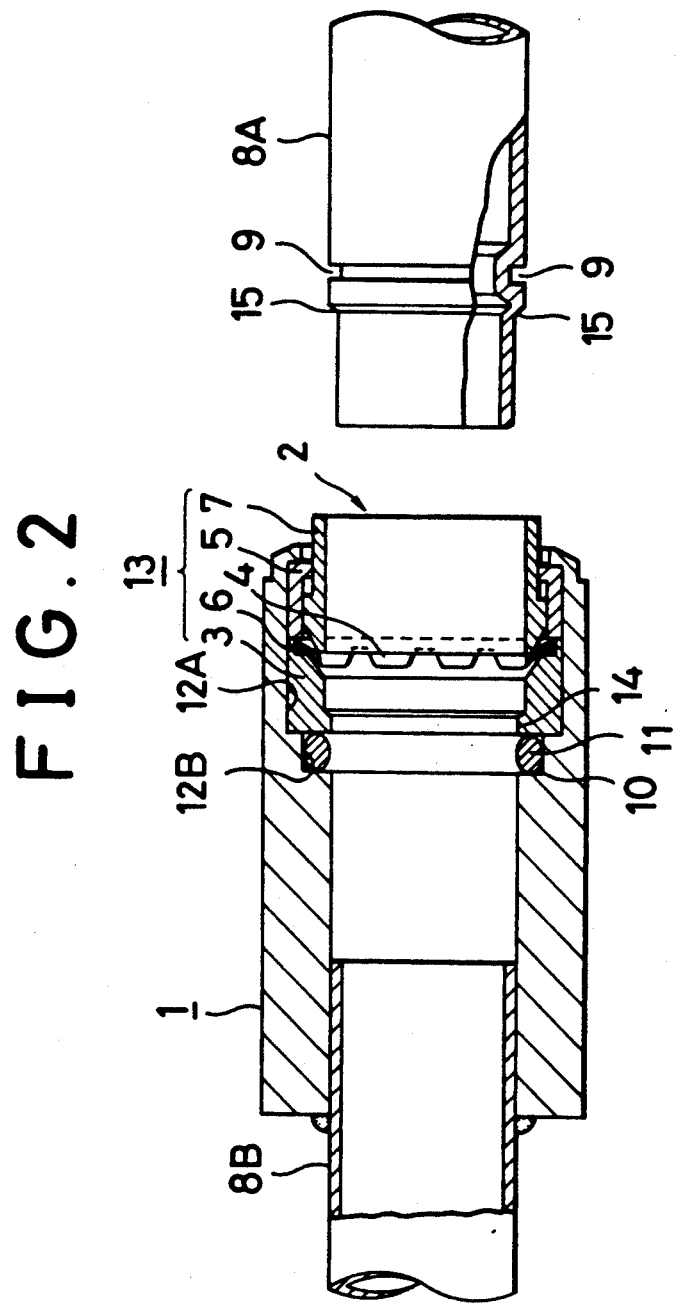
FIG. 2 is a longitudinal cross section of a pipe connector according to the invention, prior to connecting pipes therein.
Figure 3:
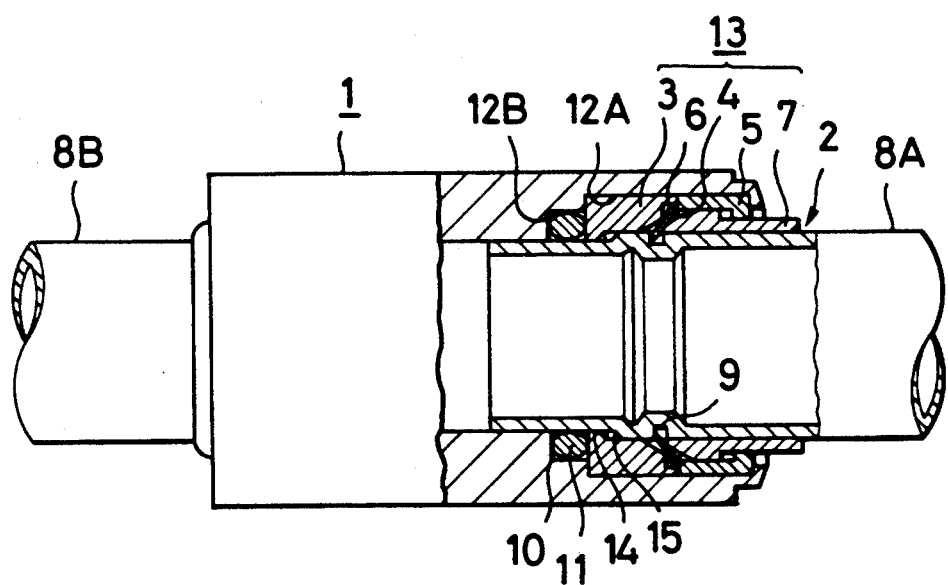
FIG. 3 is a similar cross section of the pipe connector shown in FIG. 2, with a pipe inserted in the connector.
Figure 4A:
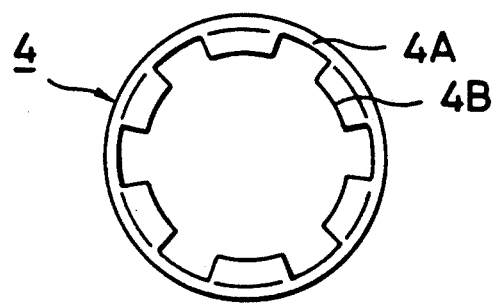
FIG. 4A is a front view of an annular plate spring according to the invention for preventing the pipe from slipping off the connector.
Figure 4B:
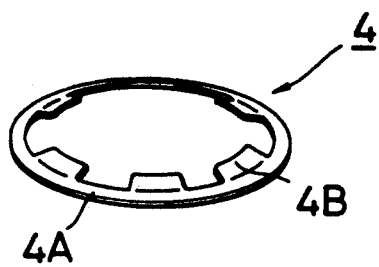
FIG. 4B is a perspective view of the annular plate spring shown in FIG. 4A.
Figure 5:
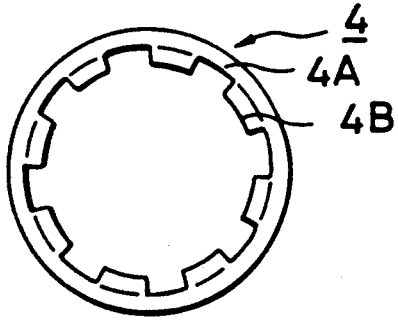
FIGS. 5 and 6 are front views of other forms of the annular plate spring.
Figure 6:
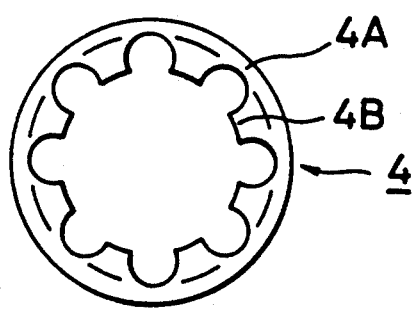

As shown in FIGS. 2 and 3, a pipe 8B is received in one end of the pipe connector body 1 and secured by any conventional means including welding and soldering. The opposite end of the connector has a first portion of diametrically larger inner cross section 12A and a second portion of diametrically smaller inner cross section 12B.

The first portion 12A accommodates a pipe receiver 13 which includes a spring receiver 3, a stop ring 5, an annular plate spring 4 inserted in an circular groove 6 formed between the spring receiver 3 and the stop ring 5, and a push member 7 which is slidably inserted and retained in the stop ring 5. The push member 7 may deviate in the axial direction of the stop ring 5 over a predetermined length. The spring receiver 3 inserted in said first portion 12A has its inner edge beveled so as to ease bending of the annular plate spring 4 abutting thereon. The stop ring 5 is inserted in the first portion 12A and at a position close to the mouth of the connector body. The circular groove 6 is formed between the spring receiver 3 and the stop ring 5.

The annular plate spring 4 inserted in the annular groove 6 prevents the pipe from slipping off the connector body 1. The outer fringe 4A of the annular groove 6 remains free, so that it may freely bend in the axial direction of the groove. The mouth of the connector body 1 is caulked so as to keep the spring receiver 3 and the stop ring 5 in position in the connector body 1.

Instead of bevelling the edge of the spring receiver 3 closer to the mouth as mentioned above, the deep end of the stop spring 5 may be bevelled. The width of the groove 6 is preferably such that the annular plate spring 4 may deviate a little in the groove.

The annular plate spring 4 has a plurality of resilient pawls 4B, whose configuration, width, thickness, length, and intervals may be appropriately chosen for the material used, as shown in FIGS. 4A–6.

The resilient pawls 4B, and hence the annular plate spring itself, may bend and spread in its axial direction when they are pushed by a pipe coming in, thereby allowing the pipe 8A to pass therethrough. As the pipe 8A is inserted in position in the connector 1, the pawls restore their normal positions by seating themselves in the groove 9 formed on the outer surface of the pipe 8A, to thereby locking the pipe 8A there in collaboration with a push member 7.

In the second portion 12B is formed an O-ring chamber behind the spring receiver 3 for accommodating an O-ring 11, which establishes airtight seal between the end of the pipe 8A and the connector body 1.

Inside the stop ring 5 is the push member 7 slidably mounted, with one end thereof extending out of the mouth of the connector body 1. The push member 7 helps release the pipe in a manner described below.

The push member 7, when pushed into the connector body 1, pushes by the tip thereof the resilient pawls 4B of the annular plate spring 4 and bend the entire spring 4 in the axial direction, since the outer edge 4A of the annular spring 4 is supported by the spring receiver 3 and the stop ring 5, thereby bending and spreading the pawls 4B in the axial direction and out of the stopper groove 9 of the pipe 8A. The stopper groove 9 is provided on the outer surface to lock the pipe in the connector. The leading end portion of the pipe 7A, ahead of the stopper groove 9, has a smaller outer diameter than the rest portion. A circumferential step 15 is formed between them.

At the deep end of the spring receiver 3 is formed a peripheral protrusion 14 having the same diameter as the inner diameter of the connector body 1. The peripheral protrusion 14 of the spring receiver 3 stops the insertion of the pipe 8A by abutting on the step portion 15 of the pipe 8A. Because of this abutment, the resilient pawls 3 will not go beyond the stopper groove 9.

The diametrically smaller end of the pipe 8A may intimately fit the O-ring 11 and provide good airtight seal therebetween.

Figure 7:
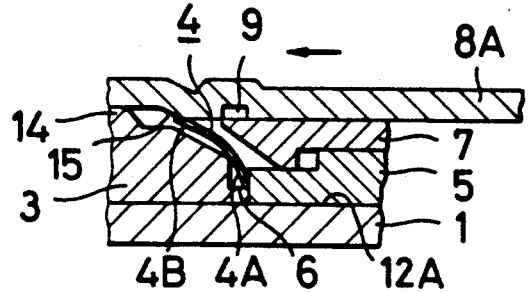
FIGS. 7 through 10 are fragmental longitudinal cross sections of the annular plate spring, for illustrating the functions of the pipe connector. In particular.

The spring 4 engages with the circular groove 6 formed between the stop ring 5 and the spring receiver 3 in the first portion 12A of the connector body 1. As the pipe 8A is inserted through the push member 7 from the mouth 2 of the connector body 1, the pawls 4B are deflected by the step 15 in the axial direction of the pipe as shown in FIG. 7, since the annular plate spring 4 is supported on one side by the spring receiver 3 and on the other side by the step 5. The outer fringe of the annular plate spring 4 is free to move in the circular groove 6. The pipe 8A is thus allowed to pass through the pawls.

As the leading end of the inserted pipe 8A reaches and pushes the O-ring 11 in the second portion 12B of the connector body 1, the O-ring 11 surmounts the outer surface of the leading end, forming airtight seal between the pipe and the connector.

Figure 8:
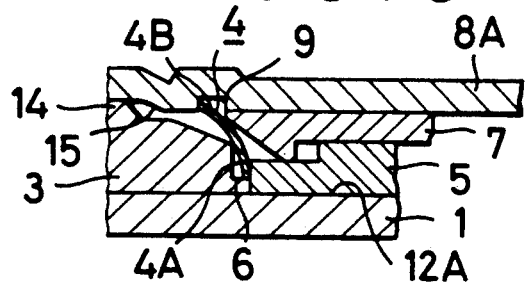

As the pipe 8A is further pushed in, the stopper groove 9 receives the spread pawls therein so that the pawls restore their normal positions, thereby securing the pipe 8A in the connector as shown in FIG. 8. The pawls 4B will not go further than the stopper groove 9, since the step 15 abuts on the peripheral protrusion 14 of the spring receiver 3 ahead of the stopper groove 9.

Figure 9:
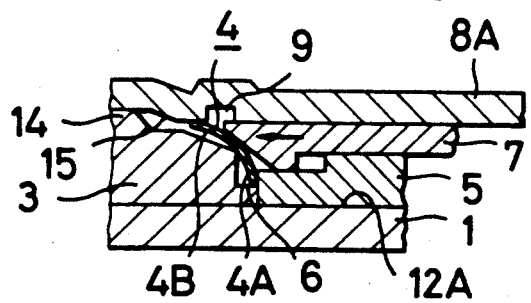

In order to disconnect the inserted pipe 8A, the portion of the push member 7 extending out of the mouth of the connecting body is pushed in. Then, as shown in FIG. 9, the leading end of the piece 7 pushes the pawls 4B inwardly. The outer edge 4A of the annular plate spring 4 is displaced in the circular groove 6, and the spring is buckled in the axial direction. Consequently, the pawls spread and come out of the stopper groove 9 to release the pipe. Now the pipe may be easily removed from the connector.

Figure 10:
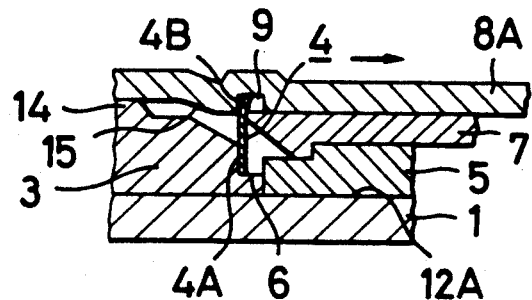

When a fluid pressure is applied from inside of the pipe 8A, the pipe 8A is pushed towards the mouth of the connector body 1, and the pawls 4B in turn pushes the push member 7 towards the mouth as shown in FIG. 10, causing the outer fringe 4A of the annular plate spring 4 to deviate in the circular groove 6 towards the spring receiver 3. However, since the push member 7 is then retained in position by the action of the stop ring 5, the annular plate spring 4 is restrained in the groove 9 and cannot escape from the pipe 8A.

In this manner the invention provides a pipe connector for connecting pipes without any tools. Connecting as well as disconnecting pipes may be easily carried out by simply applying a force on a pipe in one direction. The pipe thus connected will not be accidentally disconnected by an internal fluid pressure.

Since the annular plate spring is supported by a spring receiver and a stop ring and may freely deviate within the circular groove in the axial direction during connecting and disconnecting operations, the annular plate spring is buckled evenly and not subjected to undesirable strain causing cracks, thereby acquiring a long life.

Furthermore, under increment of fluid pressure, the connected pipe may deviate within the pipe connector, yet maintaining airtight seal of the connector by means of the O-ring, so that no fluid leakage from the connector will take place.

The pipe connector of this invention may thus provide very efficient, convenient, reliable, and precise pipe connection even in narrow space such as an engine room of an automobile. It can be used as a union by providing a connector at each end of single body.

I claim:

1. A pipe connector attached to a first pipe for connecting a second pipe having a peripheral step portion and a peripheral stopper groove on the exterior of a reduced diameter end thereof comprising:

a cylindrical pipe connector body fastened to said first pipe, said cylindrical pipe connector body including at one side thereof a mouth opening into a first portion of diametrically larger inner cross section for accommodating an annular pipe receiver body and a second portion of diametrically smaller inner cross section extending inwardly from said first portion for accommodating an O-ring through which said second pipe is inserted to maintain an airtight seal, at a predetermined depth from said mouth:

said annular pipe receiver body within said connector body first portion and provided at a leading end thereof with a diametrically smaller protrusion which will abut a step portion formed on the outer surface of said second pipe preventing said second pipe from being inserted beyond a predetermined distance in the connector body;

an annular plate spring within said pipe receiver body having resilient pawls around the inner periphery thereof, said pawls for fitting into the stopper groove of said second pipe a cylindrical push member slidable within said pipe receiver body for securing the outer periphery of said annular plate spring, said push member having a front end to abut on said resilient pawls of the annular plate spring and a rear end extending out of the mouth of said pipe connector body;

an internal stop ring at the other end of second pipe receiver body for limiting within a predetermined length the sliding motion of said push member; a spring receiver in said pipe receiver body adjacent said annular plate spring with an inner edge that is beveled for easy buckling of the annular plate spring when pushed by the second pipe inserted into the connector; and a circular groove formed between said spring receiver and said stop ring for holding therein the outer periphery of said annular plate spring, the width of said circular groove being slightly larger than the thickness of said annular plate spring;

said pawls of the annular plate spring fitting into the second pipe stopper groove on said second pipe being inserted in said pipe receiver to thereby keep said first pipe connected in the connector body, said push member when moved toward said pawls bending them to permit removal of the pawls from the stopper groove and separation of the two pipes.

2. A pipe connector for connecting pipes according to claim 1, wherein said pipe connector body comprises two of said pipe receivers on the opposite sides of the connector body.

3. A pipe connector as in claim 1 further providing caulking around the mouth of said connector body to prevent the pipe receiver body from slipping off the connector body.

4. A pipe connector attached to a first pipe for connecting a second pipe to said first pipe, said second pipe having a peripheral stopper groove on the exterior of a reduced diameter end thereof, comprising;

a pipe connector body attached to an end of said first pipe, said pipe connector body including:
a first portion of a diametrically larger inner cross section adjacent a mouth of said connector and a second portion of a diametrically smaller inner cross section extending inwardly from said first portion; an O-ring inserted in said second portion for establishing an airtight seal between said second portion and around the leading end of an inserted second pipe;
a one piece annular body having an internal circular spring receiver groove and an internal stop ring at one end thereof, said annular body secured in said connector body first portion with the end opposite said stop ring engaging said O-ring to hold it in said connector body second portion;

an annular plate spring having a plurality of inwardly extending resilient pawls held in said spring receiver groove, the reduced diameter end of said second pipe fitting through said pawls and said pawls fitting into engagement with the stopper groove formed on the outer surface of the second pipe for preventing the second pipe from slipping off the connector; and a push member slidably inserted in said annular body, said push member having a rear end extending from the mouth of the pipe connector body, and a leading end projection whose front part when the push member is pushed in for disconnection of the pipe, bends and spreads said resilient pawls and whose rear part engages the body stop ring when the push member is withdrawn.

* * * * *